April 16, 1935.    Y. LEOSTIC    1,997,800
CHEESE SLICING MACHINE
Filed Sept. 24, 1932    2 Sheets-Sheet 1

Inventor
YVES LEOSTIC

Albert R. Henry
Attorney

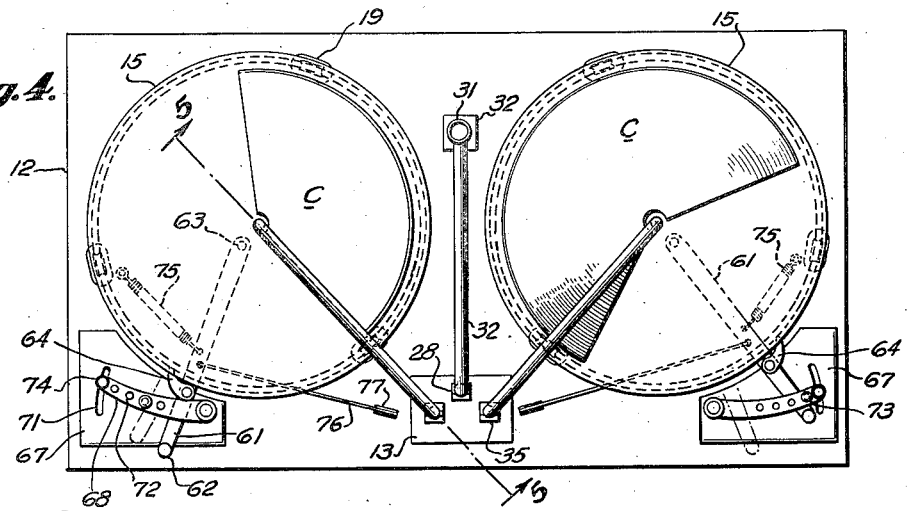

Patented Apr. 16, 1935

1,997,800

UNITED STATES PATENT OFFICE 1,997,800

CHEESE-SLICING MACHINE

Yves Leostic, Port Colborne, Ontario, Canada

Application September 24, 1932, Serial No. 634,752
In Canada April 5, 1932

9 Claims. (Cl. 31—30)

This invention relates to cheese cutting machines, and its has particular reference to apparatus for displaying and slicing foodstuffs, such as cheese, which are customarily sold at retail in groceries, delicatessens, and like stores.

The profitable sale of foodstuffs such as cheese requires the display of the article in an attractive manner, so that observation of the food leads the customer to a desire to purchase, and also require the quick dispensing of the food in an attractive slice or cut, so that the customer will be satisfied with his purchase. Heretofore apparatus for cutting cheese has not met these criteria. It is the usual custom in food shops to keep the cheese under cover, which prevents its effective display, and, upon the customer's order, to cut with a knife a piece of cheese which is estimated to be approximately the correct amount ordered, and then weigh the cheese in a separate operation. Butcher knives are usually employed for the cutting operation, and it is well known that such instruments are not satisfactory, since they may cause the cheese to crumble, and so mar the appearance of the slice which is to be sold. Rotary cutter knives, such as have been introduced for slicing cured meats, are not applicable to cutting cylindrical cheeses, and they are expensive, both of which factors have made them impracticable for retail service of the type attained by this invention.

According to the present invention, there is provided a cutter blade or wire which may be positioned over a cheese, mounted on a suitable table or board, to cut from the whole cheese a slice of desired thickness or weight. In the herein described embodiment of the inventive principles, the apparatus is contained in a cabinet, which may be utilized for storing and displaying the cheese in an attractive manner, and without danger of deterioration. The cheese is mounted on a turntable, which is so associated with a cutting knife that any desired amount may be cut at any time, and also with a feeding mechanism, by means of which the apparatus is normally conditioned automatically to serve a definite and predetermined weight of cheese. Means are also provided to insure the cutting of the cheese without danger of crumbling or breaking, and the actuating apparatus for the cutter is mounted in a concealed position in the cabinet, so that such apparatus does not tend to detract from the effectiveness of the display. These and various other features, objects, and advantages will be made more apparent from the following description of a typical embodiment of the principles of the invention, which are specifically set forth in the appended claims.

In the drawings:

Fig. 4 is a plan view of the cutting tables and associated apparatus;

Fig. 5 is a section along the line 5—5 of Fig. 4, drawn on an enlarged scale;

Fig. 6 is a fragmentary side elevation illustrating the adjusting and turning mechanism; and, Fig. 7 is an elevation of a cheese coring implement.

Figure 1:
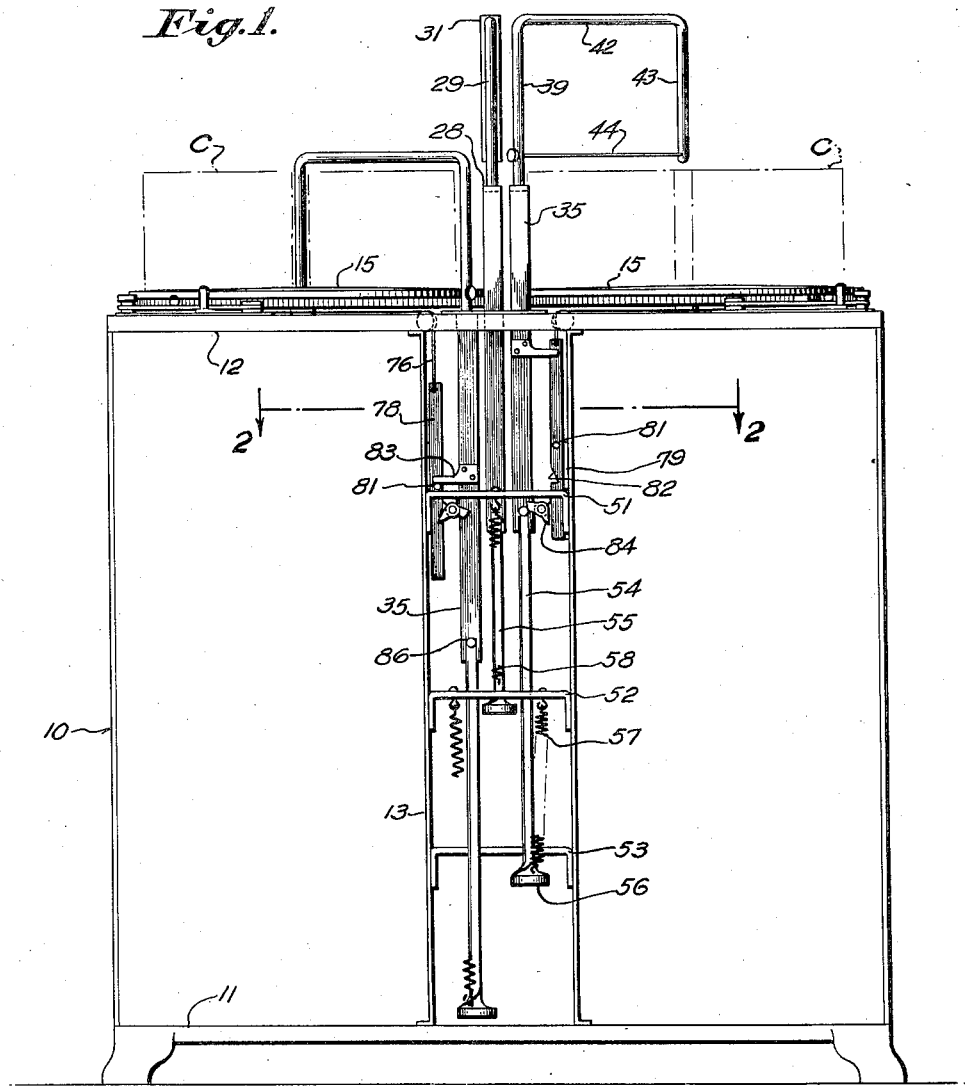
Fig. 1 is a rear elevation of the cutting apparatus contained in a display cabinet, the form of which is indicated generally.

Referring first to Fig. 1, the entire assembly is shown as comprising a cabinet 10, provided with a bottom deck 11 and a top deck 12, and a casing 13 which is disposed at the rear of the cabinet to form an enclosed housing for the operating devices hereinafter described. The casing 13 is covered on its outer surface with a removable plate 14 which may be flush with the rear wall of the cabinet 10. Within the cabinet there may be positioned shelves for the display of foodstuffs, and the upper deck 12 is also preferably covered with a casing formed with windows, to protect chees or like commodities positioned on or above the upper deck. Except as hereinafter referred to, however, the details of the cabinet structure need no further description, as they may assume a variety of forms and do not affect the operation of the cutting mechanism.

Mounted on the upper deck 12 are one or more turntables 15 adapted to hold a cheese C of the usual cylindrical form, or other foodstuff intended for display and sale. As best shown in Figs. 4 and 5, the turntable 15 is mounted on the deck 12 by means of a centrally depending shouldered boss 16 which projects into the axial recess of a ball bearing 17, located in the surface of the deck. The table 15 is further provided with a depending circumferential flange 18 which contacts with a plurality of rollers 19, each of which is mounted in a detachable housing 21 secured to the surface of the deck 12. It is not necessary, of course, that all of the rollers 19 be formed with flanges to engage the flange 18, but it is advantageous to provide a flanged connection at some points, to prevent lateral displacement of the table 15 as it rotates on the bearings 17 and 21. It may here be noted that the edge of the table 15 is vertically scored, as indicated by the numeral 22 (Fig. 6) to facilitate the operation of the automatic turning or setting mechanism hereinafter described.

Instead of being plane, as has heretofore been customary with cutting tables, the upper surface of the table 15 is curved or bowed along a pair of arcs 23 and 24, so that both the outer and inner portions of the board are lower than the junction of intersection of the arcs, which is indicated as a high point 25, located outwardly from the center of the table about one-third of the radial distance. The center itself is formed with a recess 26, and these features are highly desirous in effecting the cutting of the cheese without danger of breaking or crumbling.

Extending through the housing 13, and above the deck 12, is a vertically disposed and slidably mounted post 28, to the upper end of which is secured a rod 29 merging in a horizontal arm 30, from which depends a hollow cutting tube 31. This tube is employed to remove an axial portion from the cheese when it is first mounted on the table 15, by the operations of swinging the cutter 31 over the center of the cheese and then depressing the cutter until it penetrates into the recess 26. A solid post 32 is mounted on the deck 12 between the tables 15, and, after the cheese has been cored, the arm 29 is moved upwardly and then swung over the post 32 and again moved downwardly to extrude the core, which may subsequently be used as a sample. During the periods when the cutter 31 is not in use, it may be positioned over the post 32. If desired, the arm 30, the length of which determines the alignment of the cutter 31 with the center of the cheese, may be made extensible or of telescoping members, so that any number of cylindrical sections of cheese may be cut for subsequent slicing and sale where discs of cheese are wanted, as for sandwiches or decorative purposes.

Figures 2, 3:
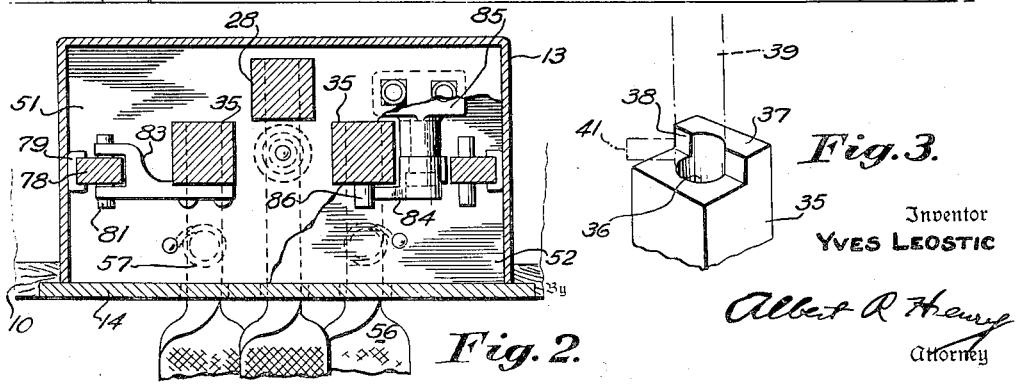
Fig. 2 is a fragmentary cross section along the line 2—2 of Fig. 1, drawn on a somewhat larger scale and showing the mounting of the operating devices in the cabinet.
Fig. 3 is a fragmentary perspective of the top of a knife post, showing the stop for the cutting element.

The cutter for slicing the cheese into segments is mounted on a square upright post 35, slidably mounted in the housing 13, and formed on its upper end with a cylindrical recess 36 and a shoulder 37 having a face 38 which is radially aligned with the center of the turntable 15. (See Fig. 3). Positioned in the recess 36 for intended turning movement is a post 39 provided with a stop pin 41 adapted to abut the face 38 during normal periods of operation, so that the cutter may be properly aligned. The post 39 merges into a horizontally disposed arm 42, which terminates in a depending arm 43 adapted, when the cutter is properly set, to overlie the recess 26 in the turntable 15. A cutting wire 44 is stretched between the arms 39 and 43, being secured directly on the arm 43 and to the arm 39 by means of a lug 45, which may be laterally adjusted by manipulation of a securing nut 46, and which is preferably positioned slightly below the point of attachment of the wire to the arm 43. In the operation of cutting the cheese by depressing the wire 44 therethrough, the wire assumes a curve or bow due to the resistance of the cheese, and the surface contour of the table 15 is such that the bowed wire, upon approaching the table and the lower portion of the cheese, first contacts the high spot 25. A slight additional depression of the frame thereupon causes the wire 44 to be further deformed to cut through the bottom of the cheese and ultimately to contact the curves 23 and 24, thereby cutting through the lower portion of the cheese cleanly with a compound shearing action, which eliminates undue strain on the wire and also avoids the tendency of the edge of the cheese to crumble in the manner encountered heretofore. A blade cutter may be employed if desired, but it will be apparent from the foregoing description that a wire cutter is preferable because of the simplicity with which fine cutting may be obtained.

It will, of course, be understood that the foregoing description of one of the cheese tables and cutters is applicable to both illustrated, and that the description, as thus far advanced, is of a mechanism which may be used for manually cutting the food, and where the weight or value of the cut is qualitatively estimated, since the table 15 may be revolved by hand to any position desired. The present invention provides means, however, for facilitating the operation of the cutters, and for automatically revolving the table and for setting it to any desired position.

The operating mechanism for the posts 35 and 28 is located in the housing 13 disposed below the deck 12, and in the cabinet 10. The housing is braced by transversely disposed flanged plates 51, 52, and 53, which are perforated as required to provide guide bearings for the posts during their reciprocatory movement. Each post terminates between the plates 51 and 52, and is connected at its lower end to a downwardly extending rod, 54 and 55 respectively, which is turned outwardly to pass through a slot in the closure plate 14 and is suitably formed to provide a foot treadle 56, by means of which the cutters may be depressed. Return springs 57 and 58, secured between the rods 54 and 55 and the plates 51 and 52, effect the return of the treadles and the lifting of the attached cutters after the cutting operation is completed.

After each cutting operation, the table 15 should be revolved to bring a new section of cheese under the wire 44, which is normally located in radial alignment with the table by virtue of the abutment of the stop pin 41 against the post face 38. Means are provided for effecting such rotation a predetermined degree, and, by cooperation with the treadle mechanism just described, to render such rotation automatic. Such means include a lever 61 provided at one end with a handle 62 and pivoted near the center of the table 15 by means of a stud 63 located in the deck 12. The lever 61 preferably lies underneath the table 15, and adjacent the emergent portion it is provided with a pawl 64 which is secured thereto by a pin 65, from which extends a keeper spring 66 urging the tooth of the pawl into engagement with the scored edge 22 of the table. (See Figs. 4 and 6). A plate 67 is disposed adjacent the table 15 and on the deck 12, to underlie the lever 61, and an overlying arm 68 is pivotally mounted to the plate at one end, as indicated by the numeral 69, for arcuate movement along a slot 71 formed in the plate 67. The arm 68 is also provided with spaced holes 72 adapted to receive a plug 73 which extends downwardly to the plate 67, so that the movement of the lever 61 may be limited as desired. The position of the lever 68 may be adjusted by swinging it over the slot 71, and such adjustment may be maintained by clamping the lever 68 by means of a screw and nut connection 74.

It will now be understood that motion of the lever 61 will, by virtue of the pawl engagement, effect the rotation of the table 15 to the extent permitted by the setting of the plugs 73, and that the effective position of the plug may be varied, over a range more limited than that obtained by the spacings of the holes 72, by shifting the lever arm 68. Such means provide a coarse and a fine setting for the permissible rotation of the turntable at any one operation, and so provide for obtaining a slice of cheese of accurately predetermined volume or weight. The full permissible throw of the lever 61 is provided for by a spring 75, the ends of which are respectively secured to the lever and the deck 12, as illustrated in Fig. 4.

The automatic rotation of the turntable 15 after each cutting operation is provided for by instrumentalities cooperating with the foot treadle 56, including a chain or wire 76 connected at one end to the midportion of the lever 61, and extending downwardly over a pulley 77 positioned in the deck 12. (See Fig. 4, and Figs. 1 and 2). The depending end of the wire 76, which extends into the housing 13, is secured to a slide bar 78 which is guided in its vertical movement by a channel member 79, secured to the wall of the housing 13. The bar 78 is provided with a pair of horizontally extending pins 81 and a recess or notch 82 for effecting an operating connection with the cutter post 35.

Secured to the post 35, and extending toward the bar 78, is a yoke 83, which, as the cutter is moved downwardly, is adapted to engage the pins 81 and thereby cause the downward movement of the bar 78 and so move the lever 61 against the tension of the spring 75. A trigger 84 is mounted on a bracket 85 secured to the plate 51, and, as the bar 78 moves downwardly, and nearly to its limit of travel, the trigger engages the recess 82, to hold the bar in such position independently of further intermediate movement of the cutter. The treadle rod 35 is further provided adjacent its lower end with a projecting pin 86 which engages the trigger 84 after the cutter blade 44 has reached a position above the top surface of the cheese, and, upon the release of the trigger, the lever 61 is then caused to move under the influence of the spring 75 to the extent permitted by the location of the plug 74, thereby rotating the table 15 and conditioning the apparatus for another cutting operation.

To summarize the operation of the machine, it is believed sufficient to state that the cheese or other material to be cut is simply placed on the table 15, a core is removed, and the adjustments made to limit the throw of the lever 61 to cut a slice of predetermined thickness. Slices of uniform weight and free from broken edges may then be removed by the simple operation of the foot treadle. If desired, of course, the lever 68 may be marked with graduations to facilitate estimating the size or weight of the slice, and the holes 72 may be so spaced as to set the apparatus for a known proportion of the slice obtained with the full throw of the lever. Such expedients require no further amplification, however, for it will be apparent to those skilled in the art that many methods of use may be employed to meet the exigencies of the situations arising in the sale of foodstuffs.

It will further be apparent that the invention provides simple but effective mechanism for cutting cheese which is associated with a display and storage cabinet, thereby providing an inexpensive apparatus which may be utilized in various types of retail food stores. The various structural features of the invention, as they have been illustrated herein, may, of course, be altered or replaced by equivalent means for attaining the same results, and accordingly, in describing my invention and setting forth the same in the appended claims, I do not intend to be limited to such express details, but desire a scope for my invention commensurate with the novel principles thereof as herein set forth.

I claim:

1. A cheese cutter comprising a rotatable cutting board for receiving a cheese, a vertically slidable frame positioned adjacent said board, said frame having spaced vertical portions respectively disposed over the center of the table and beyond the circumference thereof, said center portion being shorter than said other portion, a rigid arm connecting said portions at the upper ends thereof, a cutting wire extending between the lower portions of the frame, mounting means for said frame secured thereto at the portion thereof disposed beyond the board, and means for moving the frame and wire downwardly toward said board, said board being formed with a central recess adapted to receive the end of the vertical portion of said frame aligned therewith, and with a curved surface corresponding to the deformation of said wire as it passes through the cheese.

2. A cheese cutter comprising a deck provided with a table for receiving a cheese, and a vertically slidable post mounted on said deck beyond the limits of said table, said post being provided with an offset portion having a depending hollow tube secured thereto, means for rotatably securing said post so that said post may be swung over said table with said tube in alignment with the center thereof, whereby a cylindrical core may be removed from the center of a cheese, and a solid post mounted beyond the limits of the table and over which said tube may be depressed to extrude said core.

3. In a cheese cutter comprising a turntable and a cutter adapted to slice a cheese, means for rotating said table a predetermined degree, said means comprising a lever mounted adjacent said table and provided with a pawl adapted to engage the edge of said table to effect the rotation thereof, a shiftable arm angularly disposed with respect to said lever, a stop plug adjustably mounted on said arm to limit the movement of said lever, and a stop member for setting said shiftable arm in a predetermined position.

4. The combination with a turntable adapted to receive a cheese and means for cutting said cheese, of instrumentalities for imparting to said table a limited motion of rotation, comprising a lever mounted below said table and projecting therebeyond, a pawl on said lever normally engaging the circumference of the table, an adjusting plate mounted below said lever and adjacent said table, a second lever pivotally mounted on said plate in angular relation to said first lever and overlying said lever along its normal path of arcuate movement, said second lever being formed with a plurality of holes adapted to receive a plug projecting downwardly into the path of the lever and serving as a stop therefor, whereby the permissible movement of said first named lever may be determined within general limits, and means on said second lever for shifting it over said plate to move said plug within accurately defined limits, and means for securing said second lever in predetermined position.

5. In a cheese cutter including a rotatable table and a cutting member, a lever mounted adjacent the table and having a pawl adapted to engage the table, a spring for pulling the lever in one direction, means attached to said cutter for effecting the movement thereof, means on said attached means operably connected to said lever to move the same against the spring when said cutting member is operated, means for locking said lever in its extended position, and means effective after the return of said cutting member to a non-cutting position to release said lock and thereby effect the return of said lever and the rotation of said table.

6. A cheese cutter comprising a rotatable table, a cutter disposed above said table and mounted for reciprocating vertical movement relative to said table, means associated with said table for imparting thereto a rotary movement, and means interconnecting said cutter and said table moving means to condition said table moving means for operation as said cutter is actuated, means for holding said table moving means in said conditioned position, and means actuated by said cutting means for releasing said holding means after said cutter returns to a position above said table.

7. A cheese cutter comprising a deck having a turntable mounted thereon, a cutter mounted above said deck and said table, a rod connected to said cutter and projecting through said deck, means for imparting to said rod and cutter a vertical reciprocatory movement, a lever positioned adjacent said table, a spring secured to the lever and deck, means for moving said lever to extend said spring comprising a cable attached to said lever and extending through said deck, a bar connected to said cable, said bar being positioned for sliding movement adjacent said rod, means on said rod for engaging said bar as said rod is moved downwardly, means for holding said bar in the position to which it is carried by said rod, means on said rod for releasing said holding means as said rod is moved upwardly to elevate said cutter above said table, and pawl means on said lever for engaging said table during return movement of said lever by said spring.

8. A cheese cutter comprising a deck, a housing below said deck, a cutter mounted above said deck, a post extending through said deck into said housing having a cutter mounted on the upper end thereof, a lever mounted adjacent said table, means on said lever for engaging said table when said lever is moved in one direction, a cable extending from said lever through said deck into said housing, a bar attached to said cable, common means extending transversely of said housing to guide said post and said bar for vertical reciprocatory movement therein, means on said post for moving said bar downwardly as said post is depressed, means on said transversely extending means for securing said bar in a downward position, and means on said post for releasing said securing means operable only when said post moves upwardly to approximately its extreme position.

9. A food display and dispensing apparatus comprising a cabinet having a top deck, cutting boards mounted on said deck, cutter posts mounted on the rear of said deck adjacent said boards and projecting downwardly through said deck, said cutter posts being formed with portions adapted to extend over said boards, a housing disposed within said cabinet at the rear thereof and around said downwardly projecting cutter posts, whereby said cutter posts are contained within said cabinet but are isolated from the food compartment thereof, operating levers secured to said cutter posts in said housing, and means extending from the rear of said housing and said cabinet for operating said operating levers, said housing being provided with transversely disposed members formed with apertures providing guides for said posts and levers.

YVES LEOSTIC.